(12) United States Patent
Dede et al.

(10) Patent No.: US 10,627,653 B2
(45) Date of Patent: Apr. 21, 2020

(54) THERMAL GUIDING FOR PHOTONIC COMPONENTS

(71) Applicant: Toyota Motor Engineering & Manufacturing North America, Inc., Erlanger, KY (US)

(72) Inventors: Ercan Mehmet Dede, Ann Arbor, MI (US); Paul Donald Schmalenberg, Ann Arbor, MI (US); Tsuyoshi Nomura, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 75 days.

(21) Appl. No.: 15/688,026

(22) Filed: Aug. 28, 2017

(65) Prior Publication Data

US 2019/0064554 A1 Feb. 28, 2019

(51) Int. Cl.
  *G02B 6/42* (2006.01)
  *G02F 1/01* (2006.01)
  *G02F 1/015* (2006.01)
  *G02B 6/12* (2006.01)

(52) U.S. Cl.
  CPC ......... *G02F 1/0147* (2013.01); *G02B 6/4266* (2013.01); *G02B 6/4273* (2013.01); *G02B 2006/12135* (2013.01); *G02F 2001/0151* (2013.01)

(58) Field of Classification Search
  CPC ........... G02F 1/0147; G02F 2001/0151; G02B 6/02204; G02B 6/4266; G02B 6/4268; G02B 6/4269; G02B 6/4273
  USPC ............. 385/1, 14, 131; 361/688, 697, 690, 361/703–705
  See application file for complete search history.

(56) References Cited

U.S. PATENT DOCUMENTS

| | | | |
|---|---|---|---|
| 7,297,399 B2* | 11/2007 | Zhang | F28F 13/00 361/704 |
| 7,720,328 B2 | 5/2010 | Yan et al. | |
| 8,516,831 B2 | 8/2013 | Dede | |

(Continued)

OTHER PUBLICATIONS

Loke, et al. 2016, Design of a Nanoscale, CMOS-Integratable, Thermal-Guiding Structure for Boolean-Logic and Neuromorphic Computation; ACS Appl. Mater. Interfaces 2016, 8, 34530-34536, DOI: 10.1021/acsami.6b10667.

(Continued)

*Primary Examiner* — Robert Tavlykaev
(74) *Attorney, Agent, or Firm* — Christopher G. Darrow; Darrow Mustafa PC (57) ABSTRACT

System, methods, and other embodiments described herein relate to directing thermal energy within a photonic device. In one embodiment, the photonic device includes an optical component that is temperature sensitive and that provides a different response to light propagated within the optical component according to a present temperature of the optical component. The photonic device includes a heat source disposed at a separating distance from the optical component and that produces thermal energy within the photonic device. The photonic device includes a first thermal guide disposed proximate to the optical component and the heat source and spanning the separating distance. The first thermal guide concentrating the thermal energy from the heat source to the optical component.

20 Claims, 6 Drawing Sheets

(56) References Cited

U.S. PATENT DOCUMENTS

| | | |
|---|---|---|
| 9,125,299 B2 | 9/2015 | Wittenberg et al. |
| 9,366,822 B1 | 6/2016 | Lentine et al. |
| 9,433,074 B2 | 8/2016 | Dede et al. |
| 9,511,549 B2 | 12/2016 | Dede et al. |
| 2007/0289729 A1* | 12/2007 | Campbell ............ H01L 23/3677 165/185 |
| 2010/0111461 A1* | 5/2010 | Takahashi ............... G02F 1/011 385/1 |
| 2010/0187442 A1* | 7/2010 | Hochberg ............. G01S 7/4814 250/492.1 |
| 2014/0284039 A1 | 9/2014 | Dede et al. |
| 2014/0318829 A1* | 10/2014 | Dede ..................... H05K 1/0203 174/251 |
| 2015/0277040 A1 | 10/2015 | Liang et al. |
| 2015/0351279 A1* | 12/2015 | Dede ....................... F28F 13/14 361/720 |
| 2015/0378241 A1* | 12/2015 | Eldada ..................... G02F 1/292 359/15 |
| 2016/0025430 A1 | 1/2016 | Dede et al. |
| 2016/0029476 A1 | 1/2016 | Schmalenberg et al. |
| 2016/0029518 A1 | 1/2016 | Dede et al. |
| 2016/0266466 A1 | 9/2016 | Milchberg et al. |
| 2018/0175501 A1* | 6/2018 | Byun ....................... G02F 1/292 |
| 2019/0027899 A1* | 1/2019 | Krishnamoorthy ... H01S 5/1071 |

OTHER PUBLICATIONS

Condrat, et al., 2014, Thermal-aware Synthesis of Integrated Photonic Ring Resonators. Proceedings of the 2014 IEEE/ACM International Conference on Computer-Aided Design, pp. 557-564.

Watts, et al., 2013. Adiabatic thermo-optic Mach-Zehnder switch. https://doi.org/10.1364/0L.38.000733.

\* cited by examiner

THERMAL GUIDING FOR PHOTONIC COMPONENTS

TECHNICAL FIELD

The subject matter described herein relates in general to a silicon photonic device and, more particularly, to thermal guides that control the distribution of thermal energy within a photonic device.

BACKGROUND

Thermal flux (i.e., the movement of thermal energy) through and/or around a device can change how the device functions. That is, the presence of thermal energy outside of expected constraints can cause devices to malfunction and/or operate beyond tolerances. For example, excessive thermal energy can cause connections to fail, can cause semiconductor components to fail, and so on. Moreover, in the instance of silicon photonic components such as waveguides, for example, thermal flux can correlate with changes in a response of the particular photonic components to light propagated therein. That is, in some instances, changes in temperature can cause changes in a refractive index of the component, an efficiency of the component at transmitting light, and so on. Accordingly, in circumstances where the components are expected to provide light with particular characteristics (e.g., phase), the presence of thermal flux can affect the characteristics and thereby cause difficulties. Moreover, when components that generate thermal energy are located proximate to temperature sensitive components, unintended secondary effects can be experienced through the propagation of heat from those components. Consequently, preventing thermal crossover to temperature sensitive components can be a difficult task.

SUMMARY

An example of a thermal guiding structure for directing thermal energy within a photonic device is presented herein. In one embodiment, a concentrating thermal guide is implemented to conduct thermal energy from a heat source to an optical component. For example, in order to provide separation of the thermal energy produced by the heat source from other additional components that may be temperature sensitive around the optical component, the heat source is placed a separate distance away from the optical component. In other words, whereas in some implementations, the heat source is placed directly next to, above, or may be integrated with the optical component, in the instant example, the heat source is placed away from the optical component such that thermal energy that is proximate to a location of the heat source does not affect the optical component or additional components that are proximate to the optical component because of the separating distance. Of course, as provided in the example embodiment, the concentrating thermal guide conveys or otherwise conducts the thermal energy to the optical component in a manner that focuses the thermal energy on the optical component to avoid affecting the additional nearby components.

Moreover, in one or more embodiments, the thermal guiding structure of the photonic device includes one or more shielding thermal guides disposed between the additional nearby component(s) and the optical component. In general, the shielding thermal guide(s) disperse or otherwise shield the nearby components from the thermal energy of the concentrating thermal guide and/or the heat source in order to thermally isolate the nearby components. In this way, the thermal guiding structure of the photonic device can optimize a layout of the photonic device by placing the heat source away from the optical component and can also improve control over how thermal energy is provided to the optical component.

In one embodiment, a photonic device is disclosed. The photonic device includes an optical component that is temperature sensitive and that provides a different response to light propagated within the optical component according to a present temperature of the optical component. The photonic device includes a heat source disposed at a separating distance from the optical component and that produces thermal energy within the photonic device. The photonic device includes a first thermal guide disposed proximate to the optical component and the heat source and spanning the separating distance. The first thermal guide conducts the thermal energy from the heat source to the optical component.

In one embodiment, a light detection and ranging (LIDAR) device is disclosed. The LIDAR device includes an optical component that modulates one or more characteristics of light propagated therein according to a present temperature of the optical component. The LIDAR device includes a heat source disposed at a separating distance from the optical component. The LIDAR device includes a first thermal guide disposed proximate to the optical component and the heat source and spanning the separating distance. The first thermal guide providing thermal energy to change the present temperature of the optical component.

In one embodiment, a method for dynamically controlling an optical component is disclosed. The method includes, in response to an electronic control signal that indicates an extent of response to induce in an optical component, adjusting a heat source to produce an amount of thermal energy as a function of the extent of the response. The method includes providing the thermal energy to the optical component using a first thermal guide that conducts the thermal energy to the optical component from the heat source. The method includes controlling the response in the optical component by changing a present temperature of the optical component using the thermal energy.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with thermal guides for photonic devices are disclosed herein. As previously noted, thermal energy (i.e., heat) can affect the operation of components within a device. While in some circumstances the thermal energy can be purposefully applied to, for example, adjust a refractive index of a particular component, in other circumstances, the thermal energy may be undesirable and, thus, affect a component in a way that is not desirable. However, because components are generally positioned closely together within chip scale silicon photonics and a heater is similarly disposed adjacent (e.g., above) to a component that is to be adjusted through the application of heat, the surrounding components can experience unwanted heat that can affect the surrounding components in a way that is undesirable.

Accordingly, in one embodiment, a thermal guiding structure is integrated with a photonic device to precisely guide thermal energy to an optical component while avoiding applying the thermal energy to nearby components. For example, the thermal guiding structure is generally characterized by the separation of a heat source (e.g., a heater or another semiconductor component from which heat is harvested) from an optical component that is controlled through the application of thermal energy and thus by association also away from nearby components of the optical component that may also be temperature sensitive. Thus, in one example, the heat source is disposed at a separating distance from the optical component such that the heat source is not, for example, directly adjacent to or above the optical component and thus also not directly adjacent to the noted nearby components.

Consequently, thermal energy produced by the heat source generally does not influence operation of the nearby components of the optical component since the heat source is disposed away from the nearby components. As such, the thermal guiding structure accounts for the heat source being away from the optical component by including concentrating thermal guides. In one embodiment, the concentrating thermal guides conduct the thermal energy from the heat source to the optical component so that the heat source can be disposed away from the optical component while still providing for control of the optical component through the application of the thermal energy. Thus, the concentrating thermal guides are generally routed to, for example, optimize delivery of the thermal energy to the optical component while minimizing crossover to the nearby components. In one embodiment, the concentrating thermal guides are comprised of thermally conductive traces that are, for example, copper, graphene on silica, and so on. Additionally, the concentrating thermal guides can be provided with particular inter-guide spacing, geometry, and other characteristics that optimize or otherwise customize the thermal guides for carrying the thermal energy within a particular configuration of the photonic device.

In further aspects, the thermal guiding structure also includes shielding thermal guides that function to block or otherwise prevent the thermal energy from the concentrating thermal guides from leaking toward the nearby components and thereby affecting the operation of the nearby components. Thus, in one example, the shielding thermal guides are disposed between the optical component and the nearby components so that the shielding thermal guides can divert any diffused thermal energy prior to the thermal energy reaching the nearby components. In this way, the thermal guiding structures can improve design and layout of the photonic device by permitting more robust options for placement of components while also guarding the nearby components from unwanted effects of excess thermal energy.

Figure 1:
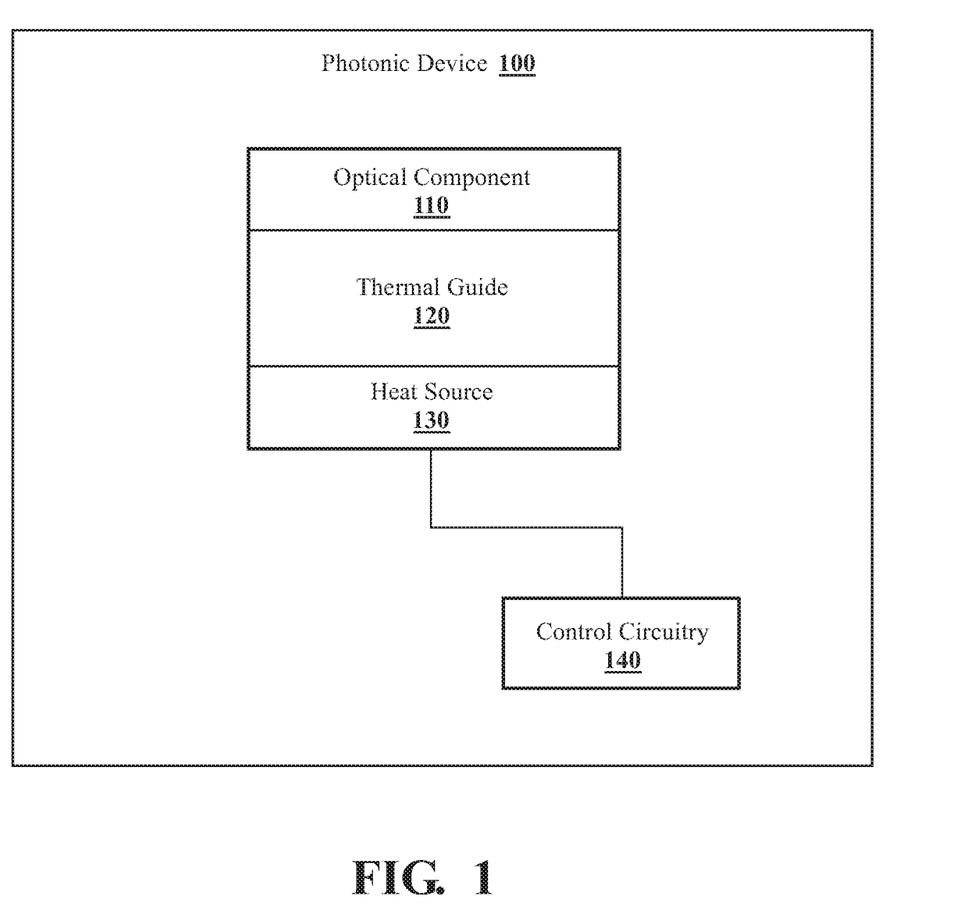
FIG. 1 is a block diagram illustrating one embodiment of a photonic device that includes a thermal guide to convey thermal energy to an optical component.

Referring to FIG. 1, an example of a photonic device 100 is illustrated. As an initial matter, the photonic device 100 is discussed as being a generic solid-state silicon photonic device but can be a LIDAR, a LADAR or other silicon photonic device that benefits from the disclosed thermal guiding structures. Thus, the embodiments disclosed herein are not limited to LIDAR sensors or the like but can be applied to silicon photonic devices (e.g. ring resonators, etc.) in general. Moreover, the disclosed photonic device 100 is generally discussed as being implemented along with electronic devices such as robots, vehicles, and so on; however, it should be appreciated that the disclosed devices, systems, and methods can be integrated with the noted devices or can be provided as standalone sensors. Additionally, as used herein, a "vehicle" is any form of motorized transport. In one or more implementations, a vehicle refers to a non-, semi-, or fully-autonomous automobile. While arrangements will be described herein with respect to automobiles, it will be understood that embodiments are not limited to automobiles. In some implementations, the vehicle may be any other form of motorized transport that, for example, benefits from data provided via the photonic device 100.

As an additional note, the photonic device 100 also includes various elements. It will be understood that in various embodiments it may not be necessary for the photonic device 100 to have all of the elements shown in FIG. 1. The photonic device 100 can have any combination of the various elements shown in FIG. 1. Further, the photonic device 100 can have additional elements to those shown in FIG. 1. In some arrangements, the photonic device 100 may be implemented without one or more of the elements shown in FIG. 1. Further, while the various elements are shown as being located within the photonic device 100 in FIG. 1, it will be understood that one or more of these elements can be located external to the photonic device 100 (e.g., control circuitry 140). Further, the elements shown may be physically separated by variable distances.

Some of the possible elements of the photonic device 100 are shown in FIG. 1 and will be described along with subsequent figures. However, for purposes of brevity of this description, some elements that may be included within the photonic device 100 have been omitted from FIG. 1 and the associated discussion. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the photonic device 100 includes an optical component 110 that is temperature sensitive. In one embodiment, temperature sensitive refers to a tendency of the optical component to have a different response to light propagated therein as the present temperature changes. That is, as more or less thermal energy is applied to the optical component 110, the optical component 110 modulates the light differently and/or to a different extent. For example, the optical component 110 is an optical phase shifter, ring resonator, optical waveguide, optical coupler, splitter, optical antenna/grating, optical filter, optical switch, photodetector, and so on. Thus, as one example, the optical component 110 can be an optical phase shifter that is actively controlled to provide different phase adjustments to light as a function of an amount of thermal energy provided to the phase shifter. That is, as additional thermal energy is applied to the phase shifter a refractive index of the phase shifter changes, thereby imparting a particular phase shift onto the light.

Thus, in one aspect, the photonic device 100 is implemented as an optical phased array antenna to provide a beam of light from the photonic device 100. Accordingly, the photonic device 100 can be implemented as a part of a LIDAR sensor or other device that uses a phased-array to guide a beam of light. Continuing with FIG. 1, the optical component 110 is thermally linked/connected or isolated via a thermal guide 120 with a heat source 130. Thus, the thermal guide 120 can include concentrating thermal guides, shielding thermal guides, or combinations thereof. In general, the concentrating thermal guides conduct or otherwise provide the thermal energy to the optical component 110 while the shielding thermal guides disperse or otherwise prevent thermal energy from reaching the optical component 110. In one embodiment, the heat source 130 is an active heat source that is, for example, controlled by control circuitry 140 to generate thermal energy on demand. As such, the heat source 130 is, for example, an n-doped heater, a p-doped heater, or another suitable semiconductor element for producing thermal energy in known quantities on demand.

In alternative embodiments, the heat source 130 is a passive heater. That is, the heat source 130 is an existing component of the photonic device 100 that produces thermal energy as a matter of course when functioning according to normal operation. Accordingly, the thermal guides 120 can be positioned about the heat source 130 in order to guide/concentrate the thermal energy that is produced by the passive heater. In this way, the photonic device can use components that are already present and repurpose thermal energy produced by the components for alternative purposes. Thus, in one embodiment, the photonic device 100 may improve the efficiency of operation through using a passive heater versus an active heater.

In either case, the thermal guide 120 spans a separating distance between the heat source 130 and the optical component 110. As previously mentioned, the spanning distance is a distance between the heat source 130 and the optical component 110 that is selected when designing the photonic device 100. Thus, the separating distance can be implemented as a distance that thermally isolates the heat source 130 from nearby components of the optical component 110, that permits placement of other components within proximity to the optical component 110 that may have a high priority or increased cost to if placed away from the optical component 110. In general, the separating distance is discussed as a distance from the optical component 110 that thermally isolates the optical component 110 and other nearby components from thermal energy produced by the heat source 130, at least if the thermal guides 120 were not present. However, it should be appreciated that with the implementation of the thermal guides 120, the heat source 130 can generally be placed wherever in the photonic device 100 that is desired. Thus, the heat source 130 can be placed according to various design efficiency concerns such as routing of different traces and/or waveguides, placement of various components to minimize run lengths and/or turns, and so on. As a general matter, a guiding aspect of placement for the heat source 130 in relation to the optical component is to improve thermal crossover to other components while providing for an improved arrangement of the other components in relation to the optical component 110.

It should further be appreciated that the photonic device 100 and many of the components of the photonic device 100 propagate light. Thus, in general, the light is provided via a light source (not illustrated) such as laser or other light source used with silicon photonic devices. Accordingly, a wavelength and other characteristics of a source light wave from the light source can be controlled either dynamically or as a particular aspect of implementation. As a further matter, it should be noted that in the context of discussing silicon photonics herein, reference to light waves, optical signals, and light all generally refer to electromagnetic radiation having a particular wavelength. For example, as discussed herein the discussed light waves may be infrared light (e.g., 1550 nm) or a similar wavelength. In further aspects, the particular wavelength of light may be varied according to particular aspects of the implementation.

The photonic device 100 along with further components such as the optical component 110 are chip-scale silicon photonic devices. In one embodiment, the silicon photonic devices discussed herein are further integrated with CMOS integrated circuit devices such as the thermal guides 120, the heat source 130, and/or the control circuitry 140 to provide additional functionality.

For example, the control circuitry 140 is operably connected with the heat source 130 via one or more control lines. Thus, in one embodiment, the control circuitry 140 functions to electronically control the heat source 130 to selectively vary an output of thermal energy. That is, the control circuitry 140, in one embodiment, adjusts or otherwise tunes the optical component 110 by controlling the heat source 130 to provide a particular amount of thermal energy via the thermal guides 120. Accordingly, the control circuitry 140 can provide dynamic adjustments to the optical component 110 via the heat source 130. Thus, in various aspects, the control circuitry 140 can control the phases of the light waves, operable connections within an optical switch, wavelengths of provided light and so on to provide various functionality for the photonic device 100. That is, in one embodiment, the control circuitry 140 can tune or otherwise adjust aspects of the optical component 110 to provide a particular response by controlling how much thermal energy is provided thereto.

Moreover, the control circuitry, in one embodiment, controls an array of optical components that are, for example, additional iterations of the optical component 110. That is, through providing multiple sets of the components 110, 120, and 130, the control circuitry 140 can control multiple separate ones of the optical components 110 in parallel so as to provide various functionality (e.g., a phased array).

As further explanation of how the concentrating thermal guide 120 can be configured, reference will now be made to FIG. 2a, FIG. 2b, and FIG. 2c, which illustrate separate views of at least a portion of the photonic device 100 of FIG. 1. As an initial matter, it should be appreciated that the photonic device 100 as illustrated in FIGS. 1 and 2 is generally a partial depiction of a more complex device. Thus, FIGS. 1 and 2 are generally provided as example arrangements in order to provide an explanation of different aspects relating to the thermal guides 120.

Figure 2A:
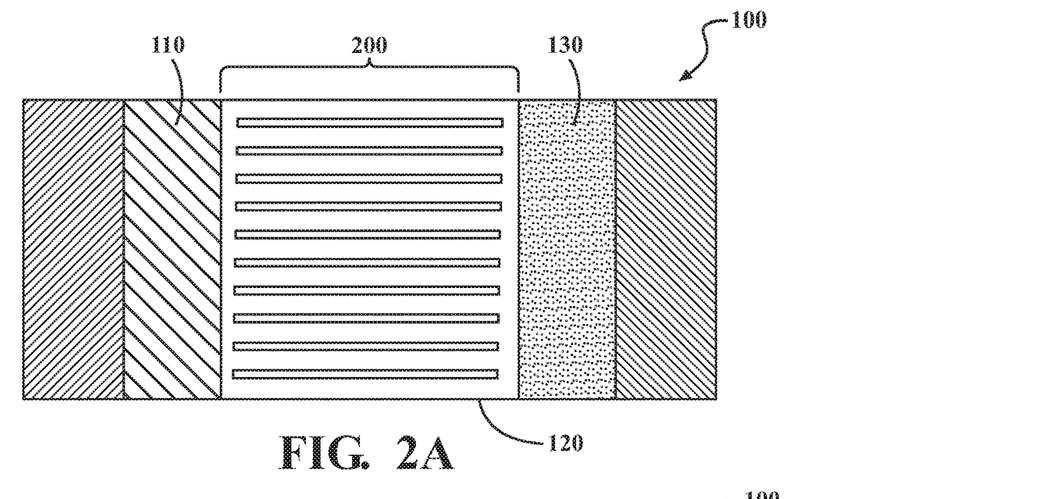
FIGS. 2a, 2b, and 2c are block diagrams illustrating separate views of two embodiments of concentrating thermal guides that span a separating distance between a heat source and an optical component.

In either case, as illustrated in FIG. 2a, the optical component 110 and the heat source 130 are disposed a separating distance 200 apart. That is, instead of the heat source 130 being adjacent to or disposed directly above the optical component 110 in order to provide thermal energy directly to the optical component 110, the heat source 130 is isolated from the optical component 110 and additional optical components (not illustrated) that may be in close proximity to the optical component 110. Moreover, it should be appreciated that while the thermal guides 120 are illustrated as stopping at respective edges of the optical component 110 and the heat source 130, in further embodiments, the thermal guide 120 extends over the optical component 110 to cover at least part of a footprint of the optical component 110 or strategically selected portions of the optical component 110 (e.g., coupling point). In further embodiments, the thermal guides 120 cover a whole footprint of the optical component 110 or extend over the whole footprint and beyond to provide consistent application of the thermal energy to the component 110 and around the component 110. Similarly, the thermal guide 120 can be configured to partially, fully, or more than fully extend over a footprint of the heat source 130.

Figure 2B:
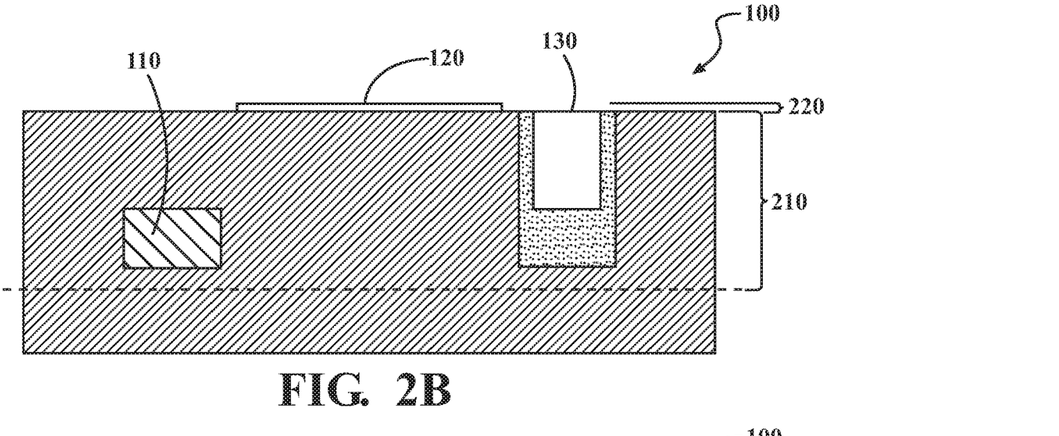

Thus, as shown in FIG. 2b, the optical component 110 and the heat source 130 are disposed within a layer 210, while the thermal guide 120 is disposed within a layer 220, or a top surface layer as shown. In either case, the thermal guides 120 can be disposed within a same layer as the other components (e.g., heater 130, and component 110), with each respective component in a separate layer, and so on. In general, the thermal guides and various components are placed and routed using an electronic design automation (EDA) tool that optimizes placement and routing according to various physics, manufacturing constraint rules, and optimization rules. In either case, the heat source 130 is placed away from the optical component 110 and the thermal guides 120 convey thermal energy to the optical component.

Figure 2C:
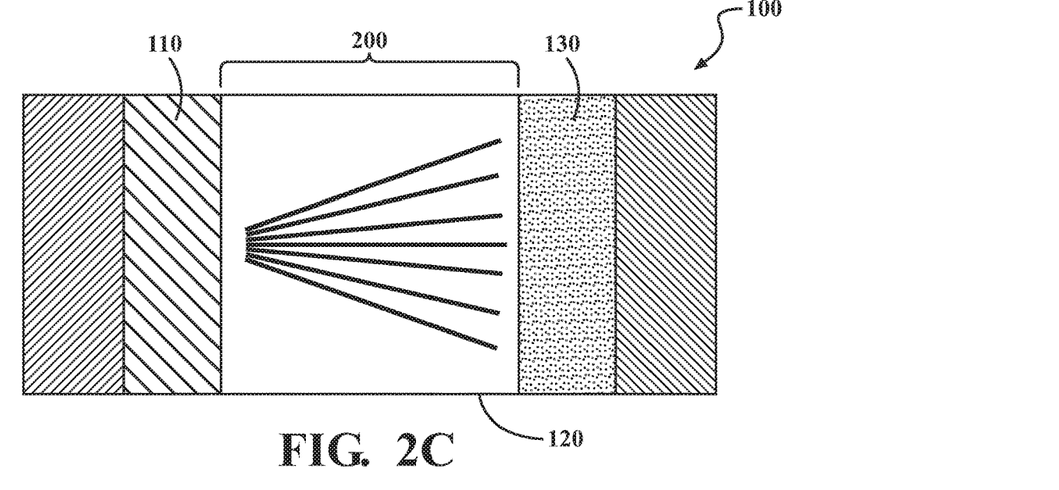

Moreover, FIG. 2c illustrates a further embodiment of the thermal guides 120. As illustrated in FIG. 2c the thermal guides are not parallel but are instead converge to a particular locality. That is, the thermal guides 120, as depicted in FIG. 2c are spaced apart near the heat source 130 and converge near the optical component 110. Accordingly, the thermal guides 120 can be arranged in many different configurations to conduct and/or disperse thermal energy.

Figure 3:
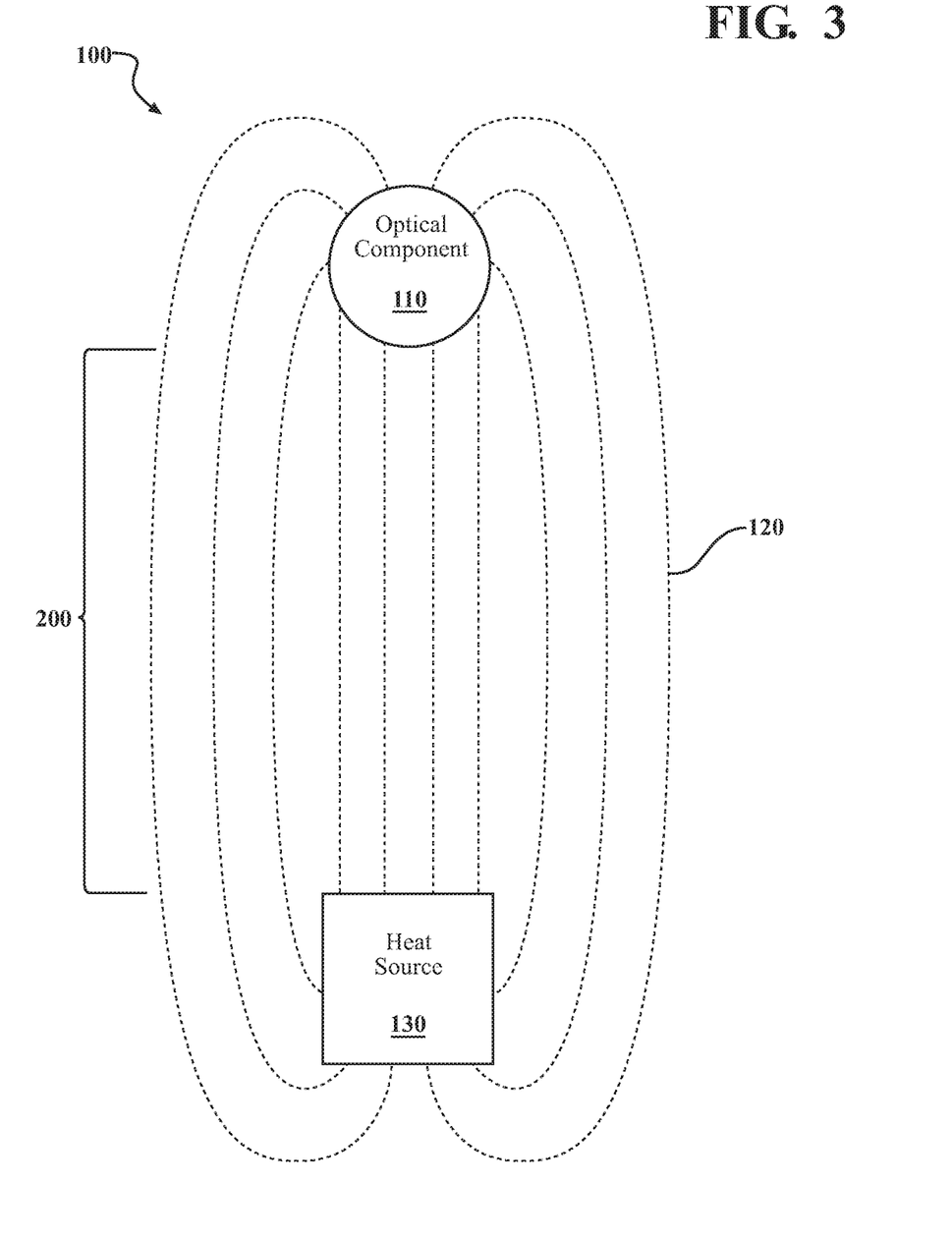
FIG. 3 is a diagram illustrating one embodiment of a configuration of concentrating thermal guides.

As a further example of possible configurations of the thermal guides 120, consider FIG. 3, which illustrates a top-view of an additional embodiment of the photonic device 100. As shown in FIG. 3, the optical component 110 is a ring resonator. Additionally, the thermal guides 120 are represented by the dashed lines extending between the optical component 110 and the heat source 130. Moreover, as illustrated in FIG. 3, the thermal guides 120 extend between the optical component 110 and the heat source 130 as well as around sides of the optical component 110 and the heat source 130 and partially to a back side of each as well. In further embodiments, the thermal guides 120 can be configured with more or fewer guides than illustrated. Thus, a density of the guides including a spacing between each of the guides can be adjusted to a particular implementation according to, for example, an amount of thermal energy that is to be conducted, the separating distance 200 between the heat source 130 and the optical component 110, and so on.

Moreover, the particular characteristics of the thermal guide 120 can be varied according to a composition of the guides 120 themselves. That is, the thermal guide 120 can be composed of, for example, copper, graphene-on-silica, diamond, or another suitable material for conducting thermal energy. In one embodiment, a material that comprises the thermal guides 120 will have a thermal conductivity that is one to two orders of magnitude different from other materials within the solid-state photonics device 100. For a particular composition of traces within the thermal guide 120, the spacing and/or a number of traces may be adjusted based on manufacturing constraints to account for an efficiency of the composition at conveying the thermal energy.

Figure 4:
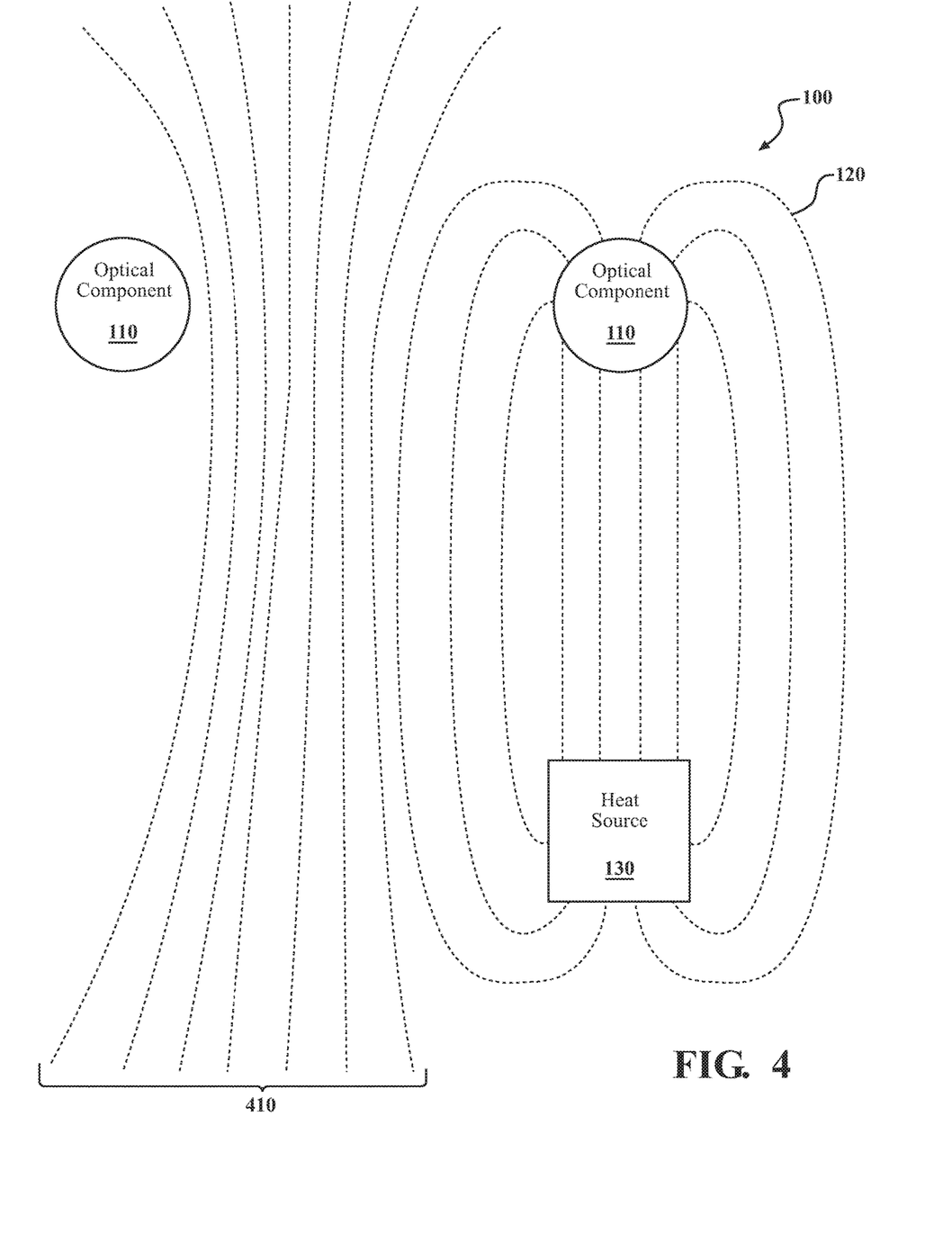
FIG. 4 is a diagram illustrating one embodiment of a photonic device with concentrating thermal guides and shielding thermal guides to facilitate preventing thermal crossover.

FIG. 4 illustrates an additional embodiment of the photonic device 100. As illustrated in FIG. 4, the photonic device 100 includes elements similar to those illustrated in FIG. 3. However, FIG. 4 is further illustrated with a secondary component 400 and a shielding thermal guide 410. The secondary component 400 can be an optical component that is similar to the optical component 110. Thus, the secondary component 400 can be an optical phase shifter, ring resonator, optical waveguide, optical coupler, splitter, optical antenna/grating, optical filter, optical switch, photodetector, and so on. In further embodiments, the secondary component 400 can be a semiconductor component (e.g., arrangement of logic gates), an analog device, or another electronic component.

In either case, the component 400 is generally temperature sensitive as previously explained. Thus, the shielding thermal guide 410 acts to cloak the secondary component 400 from thermal energy produced by the heat source 130, by the optical component 110, by control components of the optical component 110, by extraneous leaking thermal energy of the thermal guide 120, and so on. Accordingly, thermal energy that encounters the shielding thermal guide 410 is generally dispersed along a direction of the traces within the shielding thermal guide 410. Moreover, while the thermal energy is generally discussed as being conducted from the components 110, 120, 130 toward the secondary component 400, thermal energy produced by the secondary component 400 is also shielded from being conveyed to the optical component 110, the thermal guides 120, and the heat source 130. In this way, the shielding thermal guide 410 can thermally isolate components on either side. As an additional note, while the illustration in FIG. 4 is generally planar and illustrates the shielding thermal guide 410 within a same plane as the other components, in one embodiment, the various components can be disposed in different layers of a solid-state device. Thus, the shielding thermal guide 410 can be disposed in one or more layers of the device to provide for thermally isolating the various components.

Figure 5:
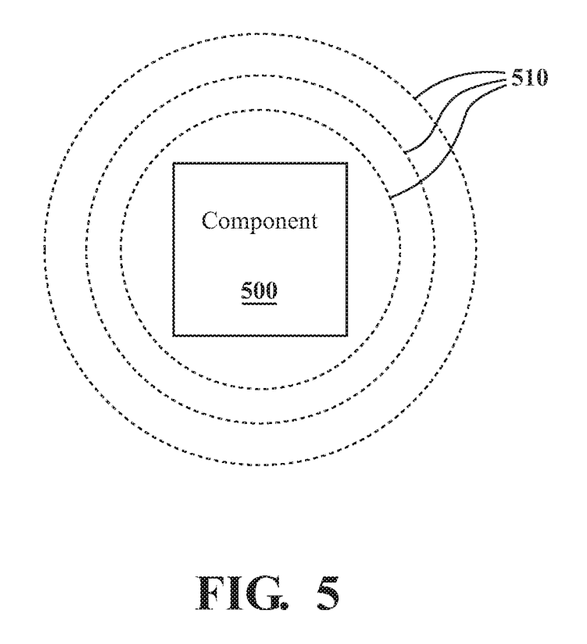
FIG. 5 illustrates one example of thermal guides for harvesting thermal energy from a component and/or shielding the component from extraneous thermal energy.

As an additional matter, FIG. 5 illustrates a further configuration of a component 500 that is surrounded by a thermal guide 510. The component 500 can be, for example, the optical component 110 or the heat source 130. In general, the thermal guide 510 is comprised of thermally conductive traces in the form of concentric rings around the component 500. In further aspects, the concentric rings of the thermal guide 510 can be disposed above the component 500, in a same layer as the component 500, below the component 500, and/or within a footprint of the component 500 on a separate. Thus, the thermal guide 510, in the case of the component 500 being a temperature regulated component such as the optical component 110, distributes thermal energy from the thermal guides 120 to the component 500. Alternatively, in a circumstance where the component 500 is a source of the thermal energy such as in the instance of the heat source 130, the thermal guides 510 contain the thermal energy from the component 500 and provide the thermal energy to the concentrating thermal guide 120 (not illustrated).

Moreover, in further aspects, the thermal guide 510 can act as a shielding thermal guide to isolate the component 500 from outside thermal energy. Consequently, the disclosed thermal guides can be configured in many different orientations, patterns, spacing, and so on to achieve the indicated improvements.

Figure 6:
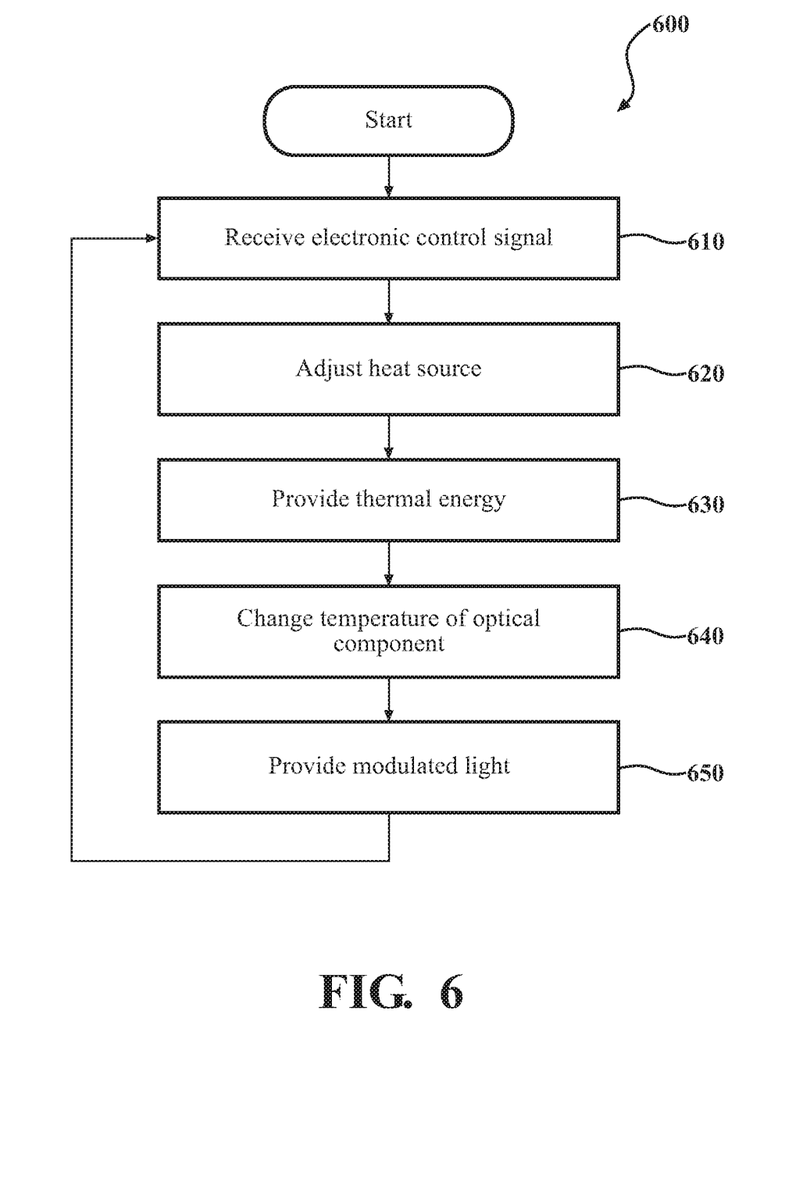
FIG. 6 is a flowchart illustrating one embodiment of a method 600 associated with selectively providing thermal energy to an optical component using concentrating thermal guides.

Additional aspects of thermal guides for a photonic device will be discussed in relation to FIG. 6. FIG. 6 illustrates a flowchart of a method 600 that is associated with controlling a photonic component by selectively providing thermal energy using a thermal guide. Method 600 will be discussed from the perspective of the photonic device 100 of FIG. 1. While method 600 is discussed in combination with the photonic device 100, it should be appreciated that the method 600 is not limited to being implemented within the photonic device 100, but is instead one example of a system that may implement the method 600 and associated components.

At 610, an electronic control signal is received that indicates an extent of response to induce in the optical component 110. In one embodiment, the control circuitry 140 receives the electronic control signal from an autonomous driving module, or other electronic entity that processes and/or otherwise uses data produced by the photonic device 100. For example, in one embodiment, the photonic device 100 is part of a LIDAR sensor that produces point cloud data about a surrounding environment of the photonic device 100 that is used to detect objects, obstacles, and other aspects of the surrounding environment. The autonomous driving module can use the point cloud data to identify a path through the surrounding environment, identify hazards, track objects, and so on.

In either case, the autonomous driving module can produce the electronic control signal to request sensor data from the photonic device 100 about a particular locality in the surrounding environment, and/or as an update to the sensor data. Alternatively, or additionally, in one embodiment, the electronic control signal is generated internally to the photonic device 100 to cause the control circuitry 140 to regularly scan the surrounding environment in a sweeping and repetitive manner in order to continuously provide an updated view of the surrounding environment. In either case, in the instance where the optical component is a phase shifter, the electronic control signal generally indicates a phase or phase pattern for controlling an emitted beam of light to have a particular direction.

In further aspects, the control signal can indicate how to control an optical switch or other component. Thus, the electronic control signal is generally interpreted by the control circuitry 140 such that the control circuitry 140 can determine an amount of thermal energy that corresponds with the desired response.

At 620, the control circuitry 140 provides an additional signal to the heat source 130 to cause the heat source 130 to adjust an amount of thermal energy presently being provided. In one embodiment, the control circuitry 140 provides the additional signal to the heat source 130 via a control input. In further aspects, the control circuitry 140 can include a plurality of control lines operably connected with the heat source 130 in order to selectively activate additional elements within the heat source 130 to produce more or less thermal energy.

At 630, the thermal guide 120 conducts, concentrates, or guides the thermal energy from the heat source 130 to the optical component 110. In one embodiment, the thermal guide 120 conducts the thermal energy using multiple thermally conductive traces. As previously indicated, the thermally conductive traces of the thermal guide 120 can be provided in many different physical configurations including different spacing, convergent/divergent geometries, and so on as a function of particular characteristics of the implementation (e.g., an amount of energy to be conducted, a distance between components, etc.).

At 640, the thermal energy supplied by the thermal guide 120 changes a temperature of the optical component 110. Thus, a response provided by the optical component 110 is controlled through the application or removal of thermal energy. That is, for example, a refractive index of the optical component 110 can be modified, a propagating efficiency can be adjusted (e.g., switch turned on or off), and so on.

At 650, the optical component 110 provides light according to the changes induced in the optical component 110 by the thermal energy. In one embodiment, the optical component 110 modulates light propagated therein differently at the present temperature induced through application of the thermal energy than previously when the optical component 110 was at a different temperature. Accordingly, the optical component 110 can be dynamically and, for example, continuously adjusted to provide a different response through selective application of thermal energy using the thermal guide 120. As an additional matter, the optical component 110 is, for example, precisely controlled through application of the particular amount of thermal energy. Thus, as previously indicated in reference to at least FIG. 4, one or more shielding thermal guides 410 can be implemented to facilitate isolating the optical component 110 from errant outside thermal energy and to isolate additional components from the thermal energy provided to the optical component 110. In this way, the optical component 110 can be precisely controlled from a heat source that is disposed away from the optical component 110 while still impacting other components.

As an additional note, while the blocks 610-650 are discussed in a serial manner, in various implementations, one or more of the blocks 610-650 execute in parallel. For example, blocks 610-620 may execute iteratively while blocks 630-650 execute iteratively in parallel such that the optical component 110 is dynamically tuned to achieve a desired effect.

FIG. 1 will now be discussed in further detail as an example environment within which the system and methods disclosed herein may operate. The photonic device 100 can include one or more processors 110, in one or more arrangements, the processor(s) can be a main processor of the photonic device 100. For instance, the processor(s) can be an electronic control unit (ECU). The photonic device 100 can include one or more data stores for storing one or more types of data. The data store can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store can be a component of the processor(s), or the data store can be operably connected to the processor(s) for use thereby. The term "operably connected," as used throughout this description, can include direct or indirect connections, including connections without direct physical contact, electrical connections, optical connections, and so on.

The one or more data stores can include sensor data. In this context, "sensor data" refers to information produced by the photonic device 100 from transmitting light and receiving responses thereto. As will be explained below, the photonic device 100 can be a part of a sensor system of a vehicle or other device. The sensor system can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system includes a plurality of sensors e.g., multiple LIDAR sensors), the sensors can function independently from each other. Alternatively, two or more of the sensors can work in combination with each other. In such a case, the two or more sensors can form a sensor network. The sensor system and/or the one or more sensors can be operably connected to the processor(s), the data store(s), and/or another element of the photonic device 100 (including any of the elements shown in FIG. The sensor system can acquire data of at least a portion of the external environment of the photonic device 100 (e.g., nearby vehicles, obstacles).

As an example, in one or more arrangements, the sensor system can include one or more radar sensors, one or more LIDAR sensors, one or more sonar sensors, and/or one or more cameras. The processor(s), and/or the autonomous driving module(s) can be operably connected to communicate with the various vehicle systems and/or individual components thereof. For example, returning to the processor(s) and/or the autonomous driving module(s) can be in communication to send and/or receive information from the various vehicle systems to control the movement, speed, maneuvering, heading, direction, etc. of a vehicle. The processor(s), and/or the autonomous driving module(s) may control some or all of the systems of a vehicle and, thus, may be partially or fully autonomous.

The photonic device 100 can include one or more modules. The modules can be implemented as computer-readable program code that, when executed by a processor, implement one or more of the various processes described herein. One or more of the modules can be a component of the processor(s), or one or more of the modules can be executed on and/or distributed among other processing systems to which the processor(s) is operably connected. The modules can include instructions (e.g., program logic) executable by one or more processor(s). Alternatively, or in addition, one or more data stores may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A photonic device, comprising:
an optical component that is temperature sensitive and that provides a different response to light propagated within the optical component according to a present temperature of the optical component;
a heat source disposed at a separating distance from the optical component, and producing thermal energy within the photonic device, wherein the separating distance thermally isolates the heat source from the optical component and one or more additional components that are proximate to the optical component; and
a first thermal guide disposed proximate to and directly between the optical component and the heat source to locally span the separating distance via an isolated route that provides for conveying the thermal energy directly between the heat source and the optical component without affecting the one or more additional components by avoiding crossover of the thermal energy to the one or more additional components from the heat source, the first thermal guide concentrating the thermal energy from the heat source to the optical component,
wherein the photonic device is a chip-scale device including the heat source, the optical component, and the first thermal guide integrated together as a single silicon-based chip, and
wherein the separating distance isolates the heat source from the optical component and provides additional spacing proximate to the optical component for the one or more additional components to be provided proximate to the optical component.

2. The photonic device of claim 1, wherein the optical component and the heat source are disposed within a first layer of the photonic device, wherein the first thermal guide is disposed within a second layer of the photonic device that is distinct from the first layer and the first thermal guide spans a footprint of the optical component within the second layer, and
wherein the heat source, the optical component, and the first thermal guide are complementary metal-oxide-semiconductor (CMOS) components.

3. The photonic device of claim 1, further comprising:
a second thermal guide disposed between the optical component, the first thermal guide, and a secondary component, the second thermal guide being operable to shield the secondary component from the thermal energy provided via the heat source and conducted through the first thermal guide,
wherein the first thermal guide locally spans the separating distance via an isolated route without connecting to a heat sink to dissipate the thermal energy.

4. The photonic device of claim 3, wherein the first thermal guide and the second thermal guide are comprised of traces within the photonic device that are thermally conductive.

5. The photonic device of claim 3, wherein the optical component and the secondary component are optical ring resonators, and wherein the second thermal guide thermally isolates the secondary component from the thermal energy conducted to the optical component by dispersing extraneous energy of the thermal energy that is directed toward the secondary component.

6. The photonic device of claim 1, wherein the heat source is an ancillary component of the photonic device that produces the thermal energy as a by-product of operating,
wherein the first thermal guide is partially arranged about the heat source as first concentric rings that encircle the heat source to direct the thermal energy from the ancillary component, and wherein the first thermal guide is partially arranged about the optical component as second concentric rings that encircle the optical component.

7. The photonic device of claim 1, wherein an arrangement of the optical component, the heat source, and the first thermal guide within the photonic device is substantially planar, wherein the heat source is an active heat source within the photonic device,
wherein the first thermal guide is comprised of a plurality of thermally conductive traces that are arranged in a pattern to concentrate the thermal energy to the optical component, and wherein the heat source is an electrically resistive heat source that selectively produces the thermal energy according to an electronic control signal.

8. The photonic device of claim 1, wherein the optical component is a phase shifter within a phased-array that dynamically changes an amount of phase shift provided to the light as a function of the present temperature, and wherein the separating distance permits the phase shifter to be in close proximity with a plurality of phase shifters in the phased-array.

9. The photonic device of claim 1, further comprising:
control circuitry operably connected with the heat source and that dynamically adjusts an amount of the thermal energy produced by the heat source to control the response of the light within the optical component.

10. A light detection and ranging (LIDAR) device, comprising:
an optical component that modulates one or more characteristics of light propagated therein according to a present temperature of the optical component, wherein the optical component is a phase shifter of a phased-array in the LiDAR device and is positioned proximate to additional phase shifters in the phased-array;
a heat source disposed at a separating distance from the optical component, wherein the separating distance thermally isolates the heat source from the optical component and the additional phase shifters that are proximate to the optical component; and
a first thermal guide disposed proximate to and directly between the optical component and the heat source to locally span the separating distance via an isolated route that provides for conveying thermal energy directly between the heat source and the optical component without affecting the one or more additional components by avoiding crossover of the thermal energy to the additional phase shifters from the heat source, the first thermal guide providing the thermal energy to change the present temperature of the optical component,
wherein the heat source, the optical component, the additional phase shifters, and the first thermal guide are integrated together within a single silicon-based chip, and
wherein the separating distance isolates the heat source from the optical component and provides additional spacing proximate to the optical component for locating the additional phase shifters of the phased-array proximate to the optical component.

11. The LIDAR device of claim 10, further comprising:
a secondary component that is temperature sensitive, wherein the secondary component is one of the additional phase shifters; and
a second thermal guide disposed between the optical component, the first thermal guide, and the secondary component to cloak the secondary component from the thermal energy concentrated by the first thermal guide, wherein the second thermal guide disperses thermal energy that leaks from the first thermal guide prior to the thermal energy reaching the secondary component, and
wherein the first thermal guide locally spans the separating distance via an isolated route without connecting to a heat sink to dissipate the thermal energy.

12. The LIDAR device of claim 11, wherein the first thermal guide and the second thermal guide are comprised of thermally conductive traces.

13. The LIDAR device of claim 10, wherein the first thermal guide is partially arranged about the heat source as first concentric rings that encircle the heat source to direct the thermal energy from the heat source, and wherein the first thermal guide is partially arranged about the optical component as second concentric rings that encircle the optical component.

14. The LIDAR device of claim 10, wherein the optical component and the heat source are disposed within a first layer of the silicon-based chip, wherein the first thermal guide is disposed within a second layer of the silicon-based chip that is coplanar and adjacent with the first layer and disposed above the first layer and the first thermal guide spans a footprint of the optical component within the second layer, and
wherein the heat source, the optical component, and the first thermal guide are complementary metal-oxide-semiconductor (CMOS) components.

15. The LIDAR device of claim 10, wherein an arrangement of the optical component, the heat source, and the first thermal guide within the silicon-based chip is substantially planar, wherein the heat source is an active heat source within the silicon-based chip,
wherein the first thermal guide is comprised of a plurality of thermally conductive traces that are arranged in a pattern to direct the thermal energy to the optical component, and
wherein the heat source is an electrically resistive heat source that selectively produces the thermal energy according to an electronic control signal.

16. The LIDAR device of claim 10, further comprising:
control circuitry operably connected with the heat source and that dynamically adjusts an amount of the thermal energy produced by the heat source to control a response of the optical component to the light, wherein the optical component is a phase shifter that dynamically changes an amount of phase shift provided to the light as a function of the present temperature, and wherein the response is an extent of phase shift provided by the phase shifter.

17. A method for dynamically controlling an optical component, comprising:
in response to an electronic control signal that indicates an extent of response to induce in an optical component, adjusting a heat source to produce an amount of thermal energy as a function of the extent of the response;
providing the thermal energy to the optical component using a first thermal guide that directs the thermal energy to the optical component from the heat source; and
controlling the response in the optical component by changing a present temperature of the optical component using the thermal energy,
wherein the heat source is disposed at a separating distance from the optical component, and produces the thermal energy, the separating distance thermally isolates the heat source from the optical component and one or more additional components that are proximate to the optical component and provides additional spacing proximate to the optical component for the one or more additional components to be provided proximate to the optical component, wherein a photonic device including the heat source, the optical component, and the first thermal guide are integrated together as a single silicon-based chip, and
wherein the first thermal guide is disposed proximate to and directly between the optical component and the heat source to locally span the separating distance via an isolated route that provides for conveying the thermal energy directly between the heat source and the optical component without affecting the one or more additional components by avoiding crossover of the thermal energy to the one or more additional components from the heat source.

18. The method of claim 17, further comprising:
providing, from the optical component, light that is modulated according to the present temperature.

19. The method of claim 18, wherein providing the light includes adjusting a phase of the light by changing the present temperature of the optical component that is a phase shifter.

20. The method of claim 18, wherein controlling the response includes adjusting an index of refraction for the optical component by changing the present temperature.

\* \* \* \* \*